United States Patent
Remy et al.

(10) Patent No.: US 12,149,419 B1
(45) Date of Patent: Nov. 19, 2024

(54) BENCHMARKING AND PREDICTION OF CLOUD SYSTEM PERFORMANCE

(71) Applicant: International Business Machines Corporation, Armonk, NY (US)

(72) Inventors: Sekou Lionel Remy, Nairobi (KE); Lauren Quigley, Red Oak, TX (US); Myneeka Holloway, San Marcos, TX (US); Akil Khamisi Sutton, Poughkeepsie, NY (US); Otis Smart, Smyrna, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/340,058

(22) Filed: Jun. 23, 2023

(51) Int. Cl.
  *H04L 41/50* (2022.01)
  *G06F 11/30* (2006.01)
  *G06F 11/34* (2006.01)

(52) U.S. Cl.
  CPC .......... *H04L 41/50* (2013.01); *G06F 11/3006* (2013.01); *G06F 11/3428* (2013.01)

(58) Field of Classification Search
  CPC ............. G06F 11/3428; G06F 11/3006; H04L 41/50
  See application file for complete search history.

(56) References Cited

U.S. PATENT DOCUMENTS

| | | | | |
|---|---|---|---|---|
| 7,698,249 | B2 * | 4/2010 | Buyuktosunoglu | G05B 13/048 706/58 |
| 8,046,207 | B2 * | 10/2011 | Glass | G06F 30/20 716/136 |
| 8,447,851 | B1 * | 5/2013 | Anderson | G06F 11/3006 709/224 |

(Continued)

FOREIGN PATENT DOCUMENTS

| | | |
|---|---|---|
| BR | 112016031016 A2 | 10/2017 |
| CN | 102193832 B | 3/2013 |

(Continued)

OTHER PUBLICATIONS

Padala et al., "Adaptive Control of Virtualized Resources in Utility Computing Environments", EuroSys'07, Mar. 21-23, 2007, ACM Publishing.*
Schaumuller, "Quality of Service for Cloud Services Using Control Theory", Oct. 2018.*
Gong et al., "An Emipirical Study of the Effect of Source-Level Loop Transformations on Compiler Stability", Proceedings of ACM Program. Language, vol. 2, Nov. 2018.*
Roy et al., "Efficient Autoscaling in the Cloud using Predictive Models for Workload Forecasting", 2011 IEEE 4th International Conference on Cloud Computing, IEEE Publishing.*

(Continued)

*Primary Examiner* — Todd L Barker
(74) *Attorney, Agent, or Firm* — CANTOR COLBURN LLP; Nicholas Welling

(57) ABSTRACT

Computer-implemented methods selecting a cloud computing system for deployment of a workload are provided. Aspects include obtaining an input function that characterizes the workload and obtaining a plurality of performance models, wherein each of the plurality of performance models corresponds to one of a plurality of cloud computing systems including the cloud computing system. Aspects also include applying the input function into each of the plurality of performance models, calculating one or more of a gain, a phase shift, and a stability margin for each of the plurality of performance models, and selecting the cloud computing system from the plurality of cloud computing systems based at least in part on the one or more of the gain, the phase shift, and the stability margin.

15 Claims, 6 Drawing Sheets

(56) References Cited

U.S. PATENT DOCUMENTS

| | | |
|---|---|---|
| 8,504,689 B2 | 8/2013 | Ferris et al. |
| 8,566,803 B2 | 10/2013 | Branson et al. |
| 8,676,530 B2 | 3/2014 | Roth et al. |
| 9,064,038 B2 | 6/2015 | Brown et al. |
| 9,413,858 B2 | 8/2016 | Leung et al. |
| 9,733,985 B2 | 8/2017 | Iyoob et al. |
| 9,813,318 B2 | 11/2017 | Iyoob et al. |
| 9,832,205 B2 | 11/2017 | Santhi et al. |
| 9,996,442 B2 | 6/2018 | France |
| 10,389,586 B2 | 8/2019 | Hockett et al. |
| 11,455,576 B2 * | 9/2022 | Dalli ................. G06N 20/00 |
| 11,477,275 B1 * | 10/2022 | Mehrotra ............ G06F 11/2038 |
| 12,058,206 B1 * | 8/2024 | Wei ................... H04L 67/1008 |
| 2007/0150252 A1 * | 6/2007 | Glass ................. G06F 30/20 |
| | | 703/22 |
| 2008/0177686 A1 * | 7/2008 | Buyuktosunoglu .. G05B 13/048 |
| | | 703/2 |
| 2013/0232346 A1 * | 9/2013 | Wu ..................... G06F 1/3296 |
| | | 713/300 |
| 2014/0279201 A1 | 9/2014 | Iyoob et al. |
| 2014/0282037 A1 | 9/2014 | Narasimhan et al. |
| 2014/0365662 A1 | 12/2014 | Dave et al. |
| 2015/0278066 A1 | 10/2015 | France |
| 2015/0341229 A1 | 11/2015 | Richter et al. |
| 2015/0341240 A1 | 11/2015 | Iyoob et al. |
| 2016/0019636 A1 | 1/2016 | Adapalli et al. |
| 2016/0125511 A1 | 5/2016 | Shaaban et al. |
| 2018/0373567 A1 * | 12/2018 | Finlay ................. G06F 9/5061 |
| 2019/0354072 A1 * | 11/2019 | Ogawa ................ G05B 13/042 |
| 2020/0192714 A1 * | 6/2020 | Clow .................. G06F 9/5011 |
| 2020/0279187 A1 * | 9/2020 | Huang ................ G06F 11/3452 |
| 2020/0296155 A1 * | 9/2020 | McGrath ............. G06F 9/5027 |
| 2020/0364131 A1 | 11/2020 | Bryant et al. |
| 2021/0014133 A1 * | 1/2021 | Maciocco ........... H04L 41/5009 |
| 2021/0073034 A1 * | 3/2021 | Bliesner ............... G06F 9/5077 |
| 2021/0097469 A1 | 4/2021 | Konti et al. |
| 2021/0103468 A1 | 4/2021 | Wang et al. |
| 2021/0287108 A1 * | 9/2021 | Hwang ............... G06F 11/3616 |
| 2022/0101156 A1 * | 3/2022 | Kalantzis .............. G06N 20/00 |
| 2022/0147876 A1 * | 5/2022 | Dalli .................... G06N 20/00 |
| 2022/0156114 A1 * | 5/2022 | Nagpal ............... G06F 11/3409 |
| 2023/0185625 A1 * | 6/2023 | Chahal .................. G06F 9/544 |
| | | 718/105 |
| 2024/0211320 A1 * | 6/2024 | Ramasamy ........... G06F 9/5083 |

FOREIGN PATENT DOCUMENTS

| | | |
|---|---|---|
| CN | 104333488 A | 2/2015 |
| CN | 102801792 B | 4/2015 |
| CN | 105491079 B | 4/2016 |
| CN | 108595306 B | 3/2021 |
| CN | 112561119 A | 3/2021 |
| IN | 202111011259 A | 3/2021 |
| WO | 2016004135 A1 | 1/2016 |

OTHER PUBLICATIONS

Sabuhi et al, "Optimizing teh Performance of Containerized Cloud Software Systems Using Adaptive PID Controllers" ACM Trans. Auton, Adapt, Syst, , Aug. 2021.*

Mohammad Hamdaqa, "An Integrated Modeling Framework for Managing the Deployment and Operation of Cloud Applications", 2016.*

Palit et al., "Demystifying cloud benchmarking," International symposium on performance analysis of systems and software (ISPASS), IEEE, 2016, 11 pages.

* cited by examiner

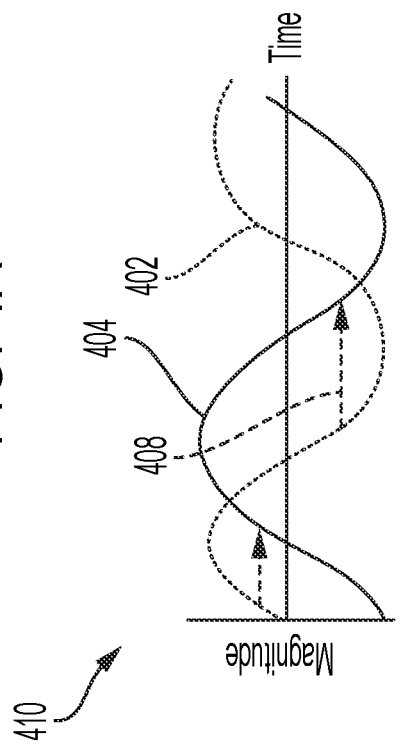
FIG. 4A
FIG. 4B
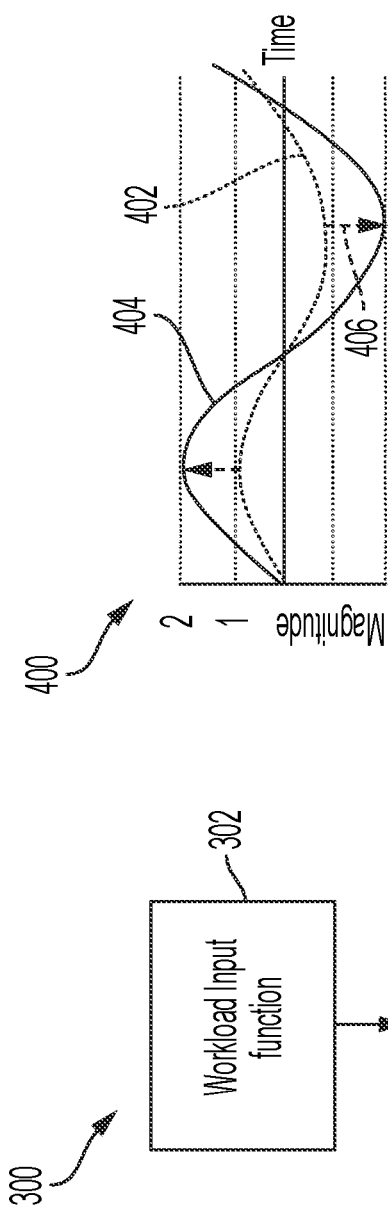
FIG. 3

BENCHMARKING AND PREDICTION OF CLOUD SYSTEM PERFORMANCE

BACKGROUND

The present invention generally relates to cloud computing systems, and more specifically, to computer systems, computer-implemented methods, and computer program products for benchmarking and prediction of the performance of cloud computing systems.

Recently, there has been a large increase in the number of cloud computing systems that are available to companies. Each of the various cloud computing systems have different configurations that include various combinations of hardware and software elements. Given the difference in the configurations of the cloud computing systems, comparing the performance of each of the cloud computing systems is often a difficult task.

Currently, the performance of a cloud computing system is typically measured by several key metrics, including response time, throughput, availability, scalability, and reliability. The response time is the amount of time it takes for a system to respond to a user's request. Throughput is the rate at which a system can process requests. Availability is the percentage of time that a system is available and functioning correctly. Scalability is the ability of a system to handle increasing workloads without a significant decrease in performance. Reliability is the ability of a system to perform consistently and reliably over time and is often measured in terms of mean time between failures (MTBF) or mean time to recover (MTTR).

SUMMARY

Embodiments of the present invention are directed to a computer-implemented method for selecting a cloud computing system for deployment of a workload. According to an aspect, a computer-implemented method includes obtaining an input function that characterizes the workload and obtaining a plurality of performance models, wherein each of the plurality of performance models corresponds to one of a plurality of cloud computing systems including the cloud computing system. Aspects also include applying the input function into each of the plurality of performance models, calculating one or more of a gain, a phase shift, and a stability margin for each of the plurality of performance models, and selecting the cloud computing system from the plurality of cloud computing systems based at least in part on the one or more of the gain, the phase shift, and the stability margin.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 is a block diagram of a system for selecting a cloud computing system for deployment of a workload in accordance with one or more embodiments of the present invention;

FIGS. 4A, 4B and 4C are graphs illustrating a comparison between the input function and output functions of a computing system in accordance with one or more embodiments of the present invention;

DETAILED DESCRIPTION

Figure 1:
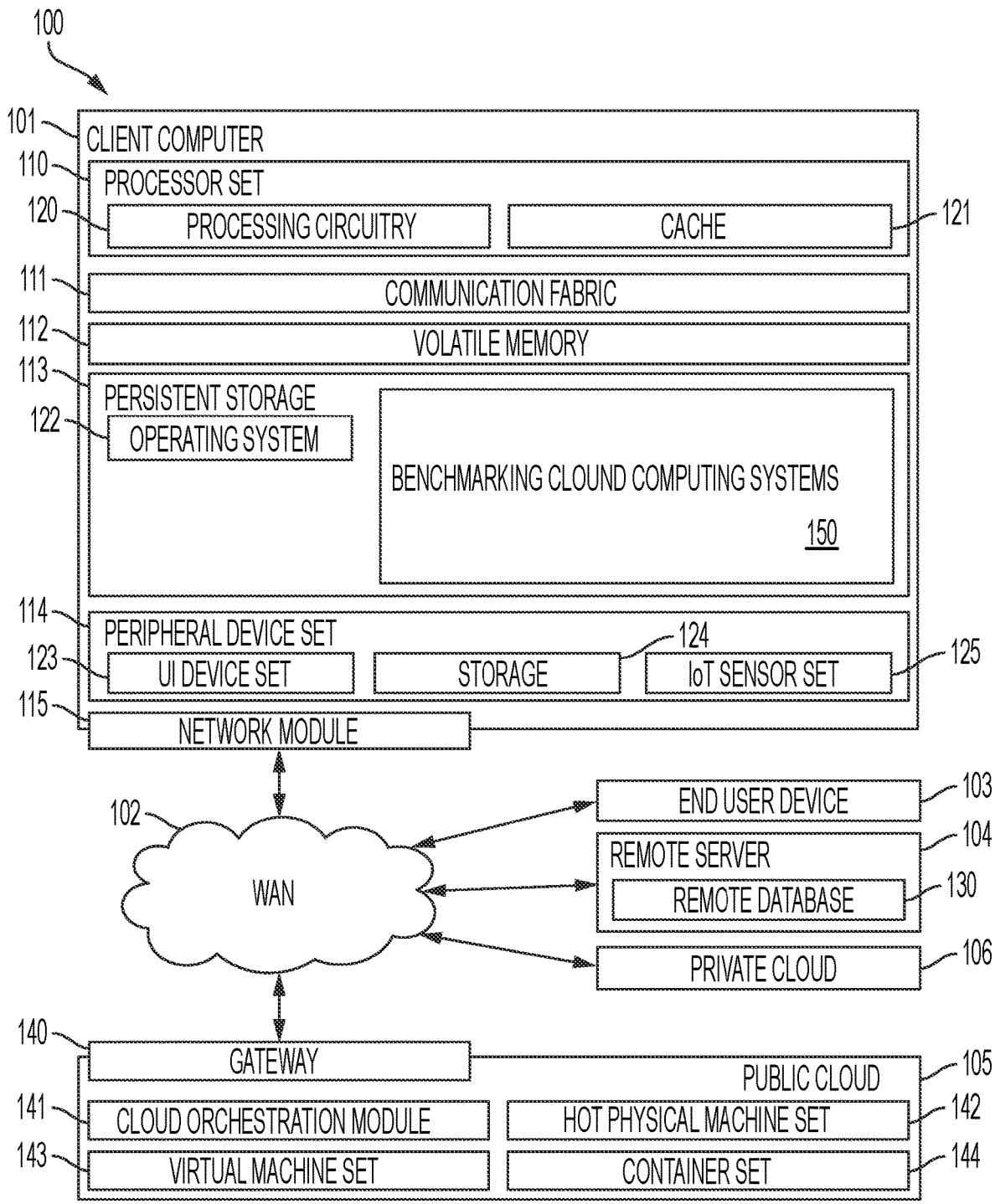
FIG. 1 depicts a block diagram of an example computer system for use in conjunction with one or more embodiments of the present invention.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as benchmarking cloud computing systems 150 and selecting a cloud computing system for the deployment of a workload. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments described herein can utilize machine learning techniques to perform tasks. More specifically, one or more embodiments described herein can incorporate and utilize rule-based decision making and artificial intelligence (AI) reasoning to accomplish the various operations described herein, namely containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Figure 2:
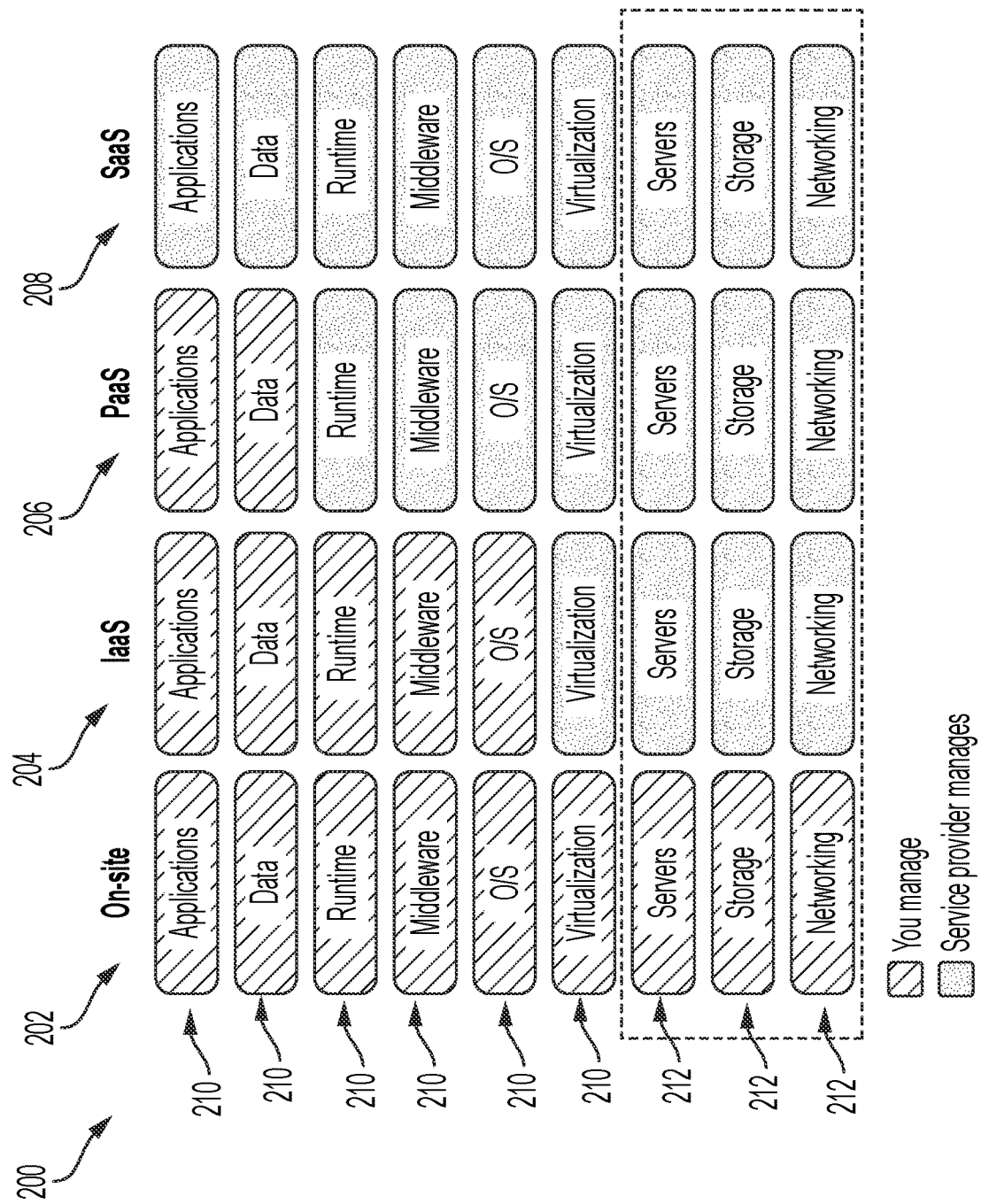
FIG. 2 depicts a schematic diagram illustrating various computing system configurations in accordance with one or more embodiments of the present invention.

As discussed above, there has been a large increase in the number of cloud computing systems that are available to companies. Each of the various cloud computing systems have different configurations that include various combinations of hardware and software elements. FIG. 2 depicts a schematic diagram 200 illustrating various computing system configurations in accordance with one or more embodiments of the present invention. In general, a computing system can be an on-site computing system 202 that is complete managed by an organization and that is typically located at a location controlled by the organization. Computing systems can also include various cloud computing systems that can be generally categorized as one of a: Infrastructure as a Service (IaaS) system 204; a Platform as a Service (PaaS) system 206; and a Software as a Service (SaaS) system 208. Each of these computing systems includes one or more software resources 210 and hardware resources 212, that function together to form the computing system.

In general, an IaaS system 204 is a type of cloud computing system that provides virtualized computing hardware resources 212 such as servers, storage, and networking. Users of the IaaS system 204 can provision and manage these resources as needed, without having to purchase and maintain physical hardware themselves. In general, an PaaS system 206 is a type of cloud computing system that provides a complete development and deployment environment for applications. Users of the PaaS system 206 can develop and deploy their applications without having to manage the underlying infrastructure. A SaaS system 208 is a type of cloud computing system that provides applications that are delivered over the internet. Users of SaaS system 208 can access and use these applications without having to install or maintain any software locally.

In addition, to the various types of computing systems that are available to companies, each of the types of computing systems can include numerous configurations that have drastically different performance characteristics and associated usage costs. For example, a number and type of both software resources 210 and hardware resources 212 can vary greatly across similar types of computing systems. Given the difference in the configurations of the cloud computing systems, comparing the performance of each of the cloud computing systems for a given workload is often a difficult task.

Referring now to FIG. 3 is a block diagram of a system 300 for selecting a cloud computing system for deployment of a workload in accordance with one or more embodiments of the present invention is shown. In exemplary embodiments, the system 300 is embodied on a computing environment 100, such as the one shown in FIG. 1. The system 300 includes a workload input function 302, which is a function that can be tuned to represent any workload. The workload function includes a plurality of variables that characterize the workload. The variables can include, but are not limited to, a frequency of a first operation performed by the workload, a magnitude of the first operation performed by the workload, a duty cycle of the first operation performed by the workload, a waveform type (e.g., sine, square, pulse, sawtooth, ramp, and arbitrary) of the first operation performed by the workload, a frequency of a second operation performed by the workload, a magnitude of the second operation performed by the workload, a duty cycle of a second operation performed by the workload, and a waveform of a second operation performed by the workload. Physical or simulated signal generators are used to synthesize a series of input waveforms spanning the full range of variables including frequency, magnitude, phase, and waveform type. The generated signals are applied to the computing configuration under test and a signal detector is used to sample the output waveform uniquely determined by the physical characteristics of the computing configuration. Through this process, one or more Performance models 304 are obtained.

The system 300 also includes a plurality of performance models 304 that are each models of a computing system, such as a cloud computing system. In one embodiment, a performance model for a computing system is obtained by executing various workloads on the cloud computing system. For example, a workload is executed on a computing system, the characteristics of the workload are captured, the output of the computing systems are capture and a model is created that will generate the captured output based on workload input function that matches the captured characteristics of the workload. In another embodiment, a performance model for a computing system is obtained based on a combination of a model for each of the software resources and hardware resources that make up the computing system. In exemplary embodiments, each a performance model for each software resources and hardware resources can be obtained and combined to create the performance model for a computing system.

In exemplary embodiments, the workload input function 302 is applied to each of the plurality of performance models 304 to generate a plurality of output functions 306. In exemplary embodiments, the performance of the cloud computing systems that correspond to the performance models 304 can be compared to one another, and to various metrics, by analyzing the output functions 306.

Figure 4C:
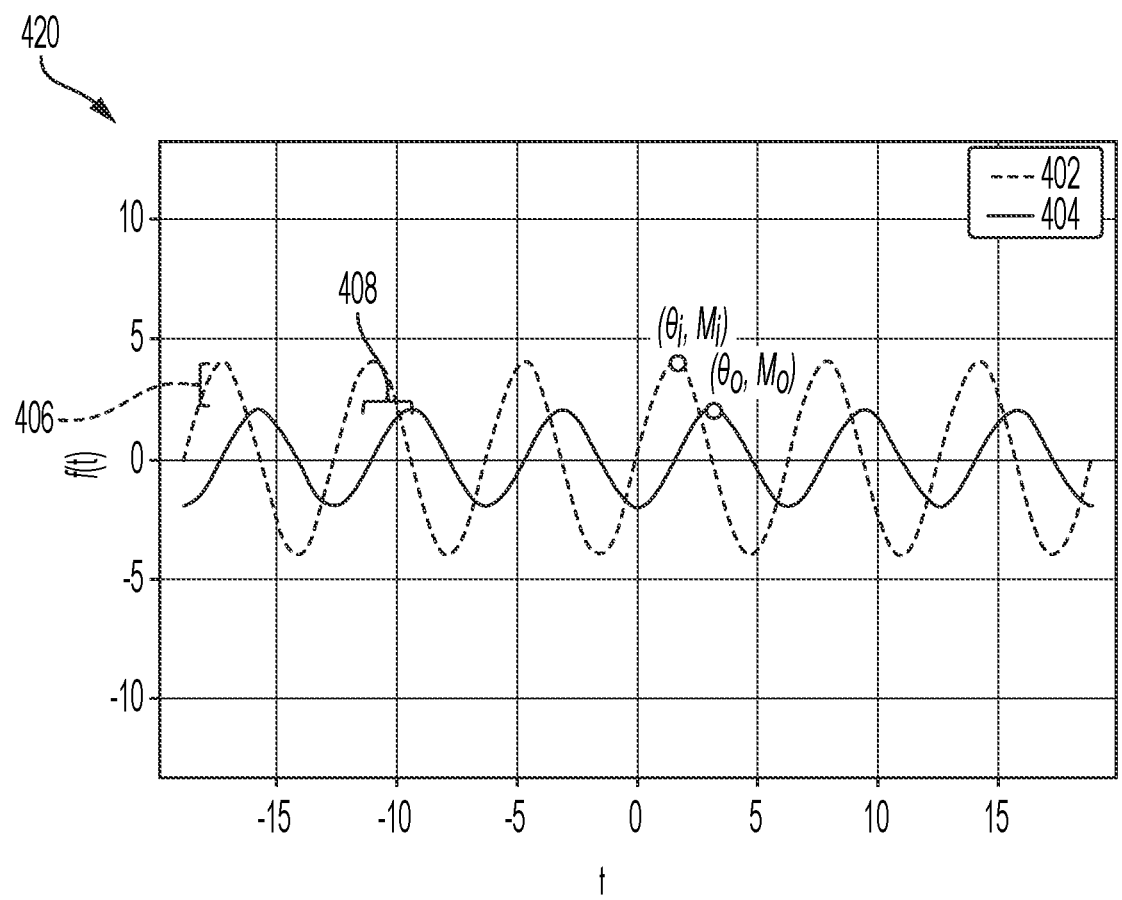

Referring now to FIGS. 4A, 4B and 4C are graphs 400, 410, 420 illustrating a comparison between the input function 402 and an output function 404 of a computing system in accordance with one or more embodiments of the present invention are shown. As illustrated, the output function 404 has both a gain 406 and a phase shift 408 when compared to the input function 402. In exemplary embodiments, the frequency, magnitude, and the duty cycle of the input function 402 can be adjusted, which will result in changes to the output function and to the gain 406 and phase shift 408 of the output function.

The gain 406 and phase shift 408 are two parameters that describe the relationship between the input function 402 and an output function 404 of the computing system. The gain 406 refers to the ratio of the amplitude of the output signal to the amplitude of the input signal, when they are at the same frequency. The gain 406 is a measure of how much the system amplifies or attenuates the input signal. In general, a high gain means that the output is much larger than the input, while a low gain means that the output is much smaller than the input. The phase shift 408 refers to the time delay between the input signal and the output signal at a given frequency. The phase shift 408 is a measure of a delay in the computing system. In general, a positive phase shift means that the output lags behind the input, while a negative phase shift means that the output leads the input. Both gain 406 and phase shift 408 are frequency-dependent, which means that they can vary as the frequency of the input signal changes. In many control systems, the gain 406 and phase shift 408 are controlled by adjusting the parameters of the system, such as the gains of the individual components or the time constants of the system.

As used herein, a stability margin is a measure of how close a computing system is to becoming unstable. The stability margin is determined based on a gain margin and a phase margin of the computing system, the gain margin is the amount of gain that can be added to the system before it becomes unstable. The gain margin is defined as the reciprocal of the gain at the frequency where the phase shift is 180 degrees. A system with a larger gain margin is more stable, as it can tolerate more gain before becoming unstable. The phase margin is the amount of phase shift that can be added to a computing system before it becomes unstable. The phase margin is defined as the amount of phase shift at the frequency where the gain is 1 (in dB) minus 180 degrees. A system with a larger phase margin is more stable, as it can tolerate more phase shift before becoming unstable.

In exemplary embodiments, both the gain margin and the phase margin can be determined from the frequency response of the computing system using Bode plots. The stability margin is usually expressed in dB or degrees, and a higher value indicates a more stable computing system. A system is considered marginally stable if the gain margin or phase margin is close to zero. If the either the gain margin or phase margin is negative, it indicates that the computing system is unstable and needs to be redesigned or tuned to improve its stability.

Figure 5:
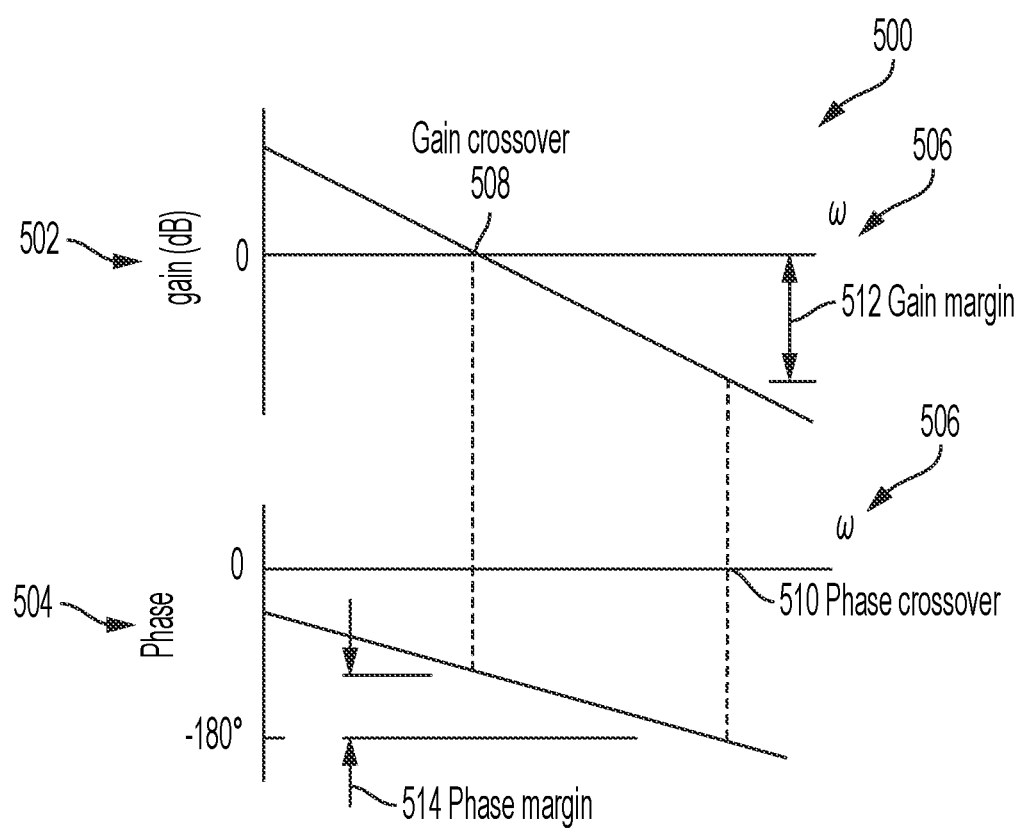
FIG. 5 is a composite graph illustrating a bode plot for identifying a stability margin of a workload deployed on a cloud computing system in accordance with one or more embodiments of the present invention.

Referring now to FIG. 5, a graph illustrating a Bode plot 500 for identifying a stability margin of a workload deployed on a cloud computing system in accordance with one or more embodiments of the present invention is shown. In general, the Bode plot 500 is a graphical representation of the frequency response of a computing system, which shows how the computing system responds to inputs of different frequencies. In exemplary embodiments, alternative graphical representations, such as the Nyquist plot, can be used to convey the same information. The Bode plot 500 illustrates the gain 502 and the phase shift 504 as a function of frequency 506. The gain 502 is the ratio of the output amplitude to the input amplitude, expressed in decibels (dB). The phase shift 504 is the time delay between the input and output signals, expressed in degrees. The Bode plot 500 illustrates how a computing system amplifies or attenuates different frequency components of the input signal and how the computing system delays or advances the different frequency components of the input signal.

In exemplary embodiments, the Bode plot 500 can be used to determine the stability of a computing system. In general, a system is stable if its gain 502 is less than one and its phase shift 504 is less than 180 degrees at all frequencies. The Bode plot 500 facilitates the identification of the frequency ranges where the computing system is unstable and where it is stable. The Bode plot 500 includes a gain crossover point 508 and a phase crossover point 510, which are used to calculate the phase margin 514 and the gain margin 512 of the computing system.

The gain crossover point 508 is the frequency at which the magnitude (i.e., gain) of the system's transfer function is equal to 0 dB. In other words, it is the frequency at which the computing system's output amplitude is equal to the input amplitude, without any amplification or attenuation. The gain crossover point 508 determines the phase margin 514 of the computing system. The phase margin 514 is the range of frequencies over which the computing system can provide a specified level of performance, such as tracking accuracy or disturbance rejection. The phase crossover point 510 is the frequency at which the phase angle of the system's transfer function is equal to −180 degrees. In other words, it is the frequency at which the computing system's output signal lags behind the input signal by 180 degrees. The phase crossover point 510 determines the gain margin 512 of the computing system. The gain margin 502 is the amount of gain 502 that can be added to the system before it becomes unstable. In general, a higher phase margin 514 and gain margin 512 indicates a more stable system.

Figure 6:
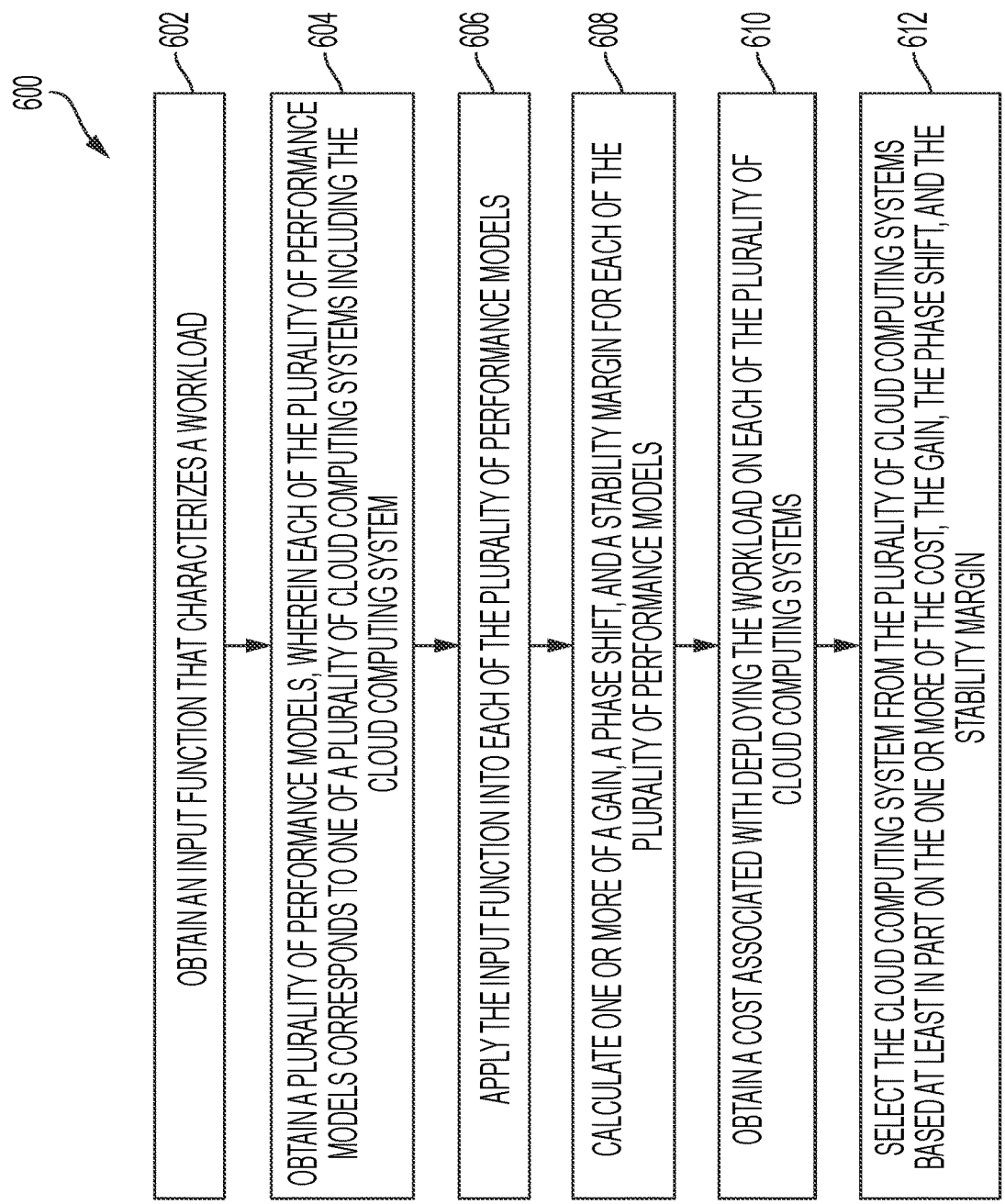
FIG. 6 is a flowchart diagrams illustrating a method for selecting a cloud computing system for deployment of a workload in accordance with one or more embodiments of the present invention.

FIG. 6 is a flowchart diagrams illustrating a method for selecting a cloud computing system for deployment of a workload in accordance with one or more embodiments of the present invention. In exemplary embodiments, the method 600 is performed by a computing environment 100, such as the one shown in FIG. 1. As shown at block 602, the method 600 includes obtaining an input function that characterizes the workload. Next, at block 604, the method 600 includes obtaining a plurality of performance models, wherein each of the plurality of performance models corresponds to one of a plurality of cloud computing systems including the cloud computing system. The method 600 also includes applying the input function into each of the plurality of performance models. In exemplary embodiments, a Bode plot for each of the plurality of performance models based on the input function is created based on applying the input function into each of the plurality of performance models.

The method 600 also includes calculating one or more of a gain, a phase shift, and a stability margin for each of the plurality of performance models, as shown at block 608. In exemplary embodiments, the stability margin includes a phase margin and a gain margin, which may be identified based on the Bode plot. Next, as shown at block 610, the method 600 includes obtaining a cost associated with deploying the workload on each of the plurality of cloud computing systems. The method 600 concludes at block 612 by selecting the cloud computing system from the plurality of cloud computing systems based at least in part on one or more of the cost, the gain, the phase shift, and the stability margin.

In exemplary embodiments, selecting the cloud computing system is performed autonomously based on a set of rules. The set of rules include a threshold range for the phase margin and a threshold range for the gain margin. In one embodiment, the method also includes automatically deploying the workload on the selected cloud computing system. In exemplary embodiments, the automated selection and deployment is based on identifying a lowest cost cloud computing system from the plurality of cloud computing systems that has a gain margin within the threshold range for the gain margin and a phase margin that is within the threshold range for the phase margin. In exemplary embodiments, the threshold range for the phase margin and the gain margin are set by a user.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for selecting a cloud computing system for deployment of a workload, the method comprising:
   obtaining an input function that characterizes the workload, wherein the input function includes a plurality of variables that characterize the workload, wherein the plurality of variables include a frequency of a first operation performed by the workload, a magnitude of the first operation performed by the workload, a duty cycle of the first operation performed by the workload, a waveform type of the first operation performed by the workload, a frequency of a second operation performed by the workload, a magnitude of the second operation performed by the workload, a duty cycle of a second operation performed by the workload, and a waveform of a second operation performed by the workload;
   obtaining a plurality of performance models, wherein each of the plurality of performance models corresponds to one of a plurality of cloud computing systems including the cloud computing system;
   applying the input function into each of the plurality of performance models;
   calculating one or more of a gain, a phase shift, and a stability margin for each of the plurality of performance models;
   obtaining a cost associated with deploying the workload on each of the plurality of cloud computing systems; and
   selecting the cloud computing system from the plurality of cloud computing systems based at least in part on the one or more of the gain, the phase shift, and the stability margin, and the cost associated with deploying the workload on each of the plurality of cloud computing systems.

2. The method of claim 1, wherein the selecting is performed autonomously based on a set of rules and wherein the method further includes automatically deploying the workload on the cloud computing system selected from the plurality of cloud computing systems.

3. The method of claim 2, wherein the stability margin includes a phase margin and a gain margin.

4. The method of claim 3, wherein the set of rules include a first threshold range for the gain margin and a second threshold range for the phase margin.

5. The method of claim 1, further comprising creating one of a Bode plot and a Nyquist plot for each of the plurality of performance models based on the input function.

6. A computing system having a memory having computer readable instructions and one or more processors for executing the computer readable instructions, the computer readable instructions controlling the one or more processors to perform operations comprising:
   obtaining an input function that characterizes the workload, wherein the input function includes a plurality of variables that characterize the workload, wherein the plurality of variables include a frequency of a first operation performed by the workload, a magnitude of the first operation performed by the workload, a duty cycle of the first operation performed by the workload, a waveform type of the first operation performed by the workload, a frequency of a second operation performed by the workload, a magnitude of the second operation performed by the workload, a duty cycle of a second operation performed by the workload, and a waveform of a second operation performed by the workload;
   obtaining a plurality of performance models, wherein each of the plurality of performance models corresponds to one of a plurality of cloud computing systems including the cloud computing system;
   applying the input function into each of the plurality of performance models;
   calculating one or more of a gain, a phase shift, and a stability margin for each of the plurality of performance models;
   obtaining a cost associated with deploying the workload on each of the plurality of cloud computing systems; and
   selecting the cloud computing system from the plurality of cloud computing systems based at least in part on the one or more of the gain, the phase shift, and the stability margin, and the cost associated with deploying the workload on each of the plurality of cloud computing systems.

7. The computing system of claim 6, wherein the selecting is performed autonomously based on a set of rules and wherein the method further includes automatically deploying the workload on the cloud computing system selected from the plurality of cloud computing systems.

8. The computing system of claim 6, wherein the stability margin includes a phase margin and a gain margin.

9. The computing system of claim 8, wherein the set of rules include a first threshold range for the gain margin and a second threshold range for the phase margin.

10. The computing system of claim 6, wherein the operations further comprise creating one of a Bode plot and a Nyquist plot for each of the plurality of performance models based on the input function.

11. A computer program product comprising a non-transitory computer readable storage medium having program instructions embodied therewith, the program instructions executable by a processor to cause the processor to perform operations comprising:
   obtaining an input function that characterizes the workload, wherein the input function includes a plurality of variables that characterize the workload, wherein the plurality of variables include a frequency of a first operation performed by the workload, a magnitude of the first operation performed by the workload, a duty cycle of the first operation performed by the workload, a waveform type of the first operation performed by the workload, a frequency of a second operation performed by the workload, a magnitude of the second operation performed by the workload, a duty cycle of a second operation performed by the workload, and a waveform of a second operation performed by the workload;
   obtaining a plurality of performance models, wherein each of the plurality of performance models corresponds to one of a plurality of cloud computing systems including the cloud computing system;

applying the input function into each of the plurality of performance models;
calculating one or more of a gain, a phase shift, and a stability margin for each of the plurality of performance models;
obtaining a cost associated with deploying the workload on each of the plurality of cloud computing systems; and
selecting the cloud computing system from the plurality of cloud computing systems based at least in part on the one or more of the gain, the phase shift, the stability margin, and the cost associated with deploying the workload on each of the plurality of cloud computing systems.

12. The computer program product of claim 11, wherein the selecting is performed autonomously based on a set of rules and wherein the method further includes automatically deploying the workload on the cloud computing system selected from the plurality of cloud computing systems.

13. The computer program product of claim 11, wherein the stability margin includes a phase margin and a gain margin.

14. The computer program product of claim 13, wherein the set of rules include a first threshold range for the gain margin and a second threshold range for the phase margin.

15. The computer program product of claim 11, wherein the operations further comprise creating one of a Bode plot and a Nyquist plot for each of the plurality of performance models based on the input function.

\* \* \* \* \*